US011554434B2

(12) United States Patent
Azdasht

(10) Patent No.: US 11,554,434 B2
(45) Date of Patent: Jan. 17, 2023

(54) METHOD AND LASER ARRANGEMENT FOR FUSING A SOLDER MATERIAL DEPOSIT BY MEANS OF LASER ENERGY

(71) Applicant: PAC TECH—PACKAGING TECHNOLOGIES GMBH, Nauen (DE)

(72) Inventor: Ghassem Azdasht, Berlin (DE)

(73) Assignee: PAC TECH—PACKAGING TECHNOLOGIES GMBH, Nauen (DE)

( * ) Notice: Subject to any disclaimer, the term of this patent is extended or adjusted under 35 U.S.C. 154(b) by 144 days.

(21) Appl. No.: 16/094,599

(22) PCT Filed: Feb. 14, 2018

(86) PCT No.: PCT/EP2018/053616
§ 371 (c)(1),
(2) Date: Oct. 18, 2018

(87) PCT Pub. No.: WO2018/158077
PCT Pub. Date: Sep. 7, 2018

(65) Prior Publication Data
US 2021/0220934 A1 Jul. 22, 2021

(30) Foreign Application Priority Data

Feb. 28, 2017 (DE) ...................... 10 2017 104 097.8

(51) Int. Cl.
*B23K 1/00* (2006.01)
*B23K 1/005* (2006.01)
(Continued)

(52) U.S. Cl.
CPC .............. *B23K 1/0056* (2013.01); *B23K 3/04* (2013.01); *B23K 3/08* (2013.01)

(58) Field of Classification Search
CPC .......... B23K 1/0056; B23K 3/08; B23K 3/04; B23K 26/00–707
(Continued)

(56) References Cited

U.S. PATENT DOCUMENTS 4,714,815 A * 12/1987 Swarts ................ B23K 1/0056
219/121.63
4,893,742 A * 1/1990 Bullock ................ B23K 20/10
228/111.5
(Continued)

FOREIGN PATENT DOCUMENTS

CN 101038986 A 9/2007
CN 106270877 A 1/2017
(Continued)

OTHER PUBLICATIONS

PCT English Language Translation of the International Preliminary Report on Patentability, PCT/EP2018/053616, dated Sep. 12, 2019, 7 pages.
(Continued)

*Primary Examiner* — Kiley S Stoner
(74) *Attorney, Agent, or Firm* — Quarles & Brady LLP

(57) ABSTRACT

The invention relates to a method for fusing a solder material deposit by means of laser energy, in which laser radiation emitted from a first laser source is applied to the solder material deposit in a first application phase by means of a first laser device (11) and laser radiation emitted from a second laser source is applied to the solder material deposit in a second application phase by means of a second laser device (12), said first laser source having a lower laser power than the second laser source, a switch being made from the first application phase to the second application phase by means of a switching device (30) and said switch being triggered by a temperature sensor, by means of which
(Continued)

the temperature of the solder material deposit is measured at least during the first application phase.

8 Claims, 1 Drawing Sheet

(51) Int. Cl.
   *B23K 3/04*   (2006.01)
   *B23K 3/08*   (2006.01)

(58) Field of Classification Search
   USPC .......................................... 219/121.6–121.66
   See application file for complete search history.

(56) References Cited

U.S. PATENT DOCUMENTS

| | | | |
|---|---|---|---|
| 4,909,428 A * | 3/1990 | Mermet-Guyennet | ....................... H01L 21/67144 228/179.1 |
| 5,059,760 A * | 10/1991 | Iehisa | .................. B23K 26/032 219/121.62 |
| 5,977,512 A | 11/1999 | Azdasht et al. | |
| 6,336,581 B1 * | 1/2002 | Tuchiya | ............... B23K 3/0623 228/41 |
| 6,527,193 B1 * | 3/2003 | Beli | ....................... G06K 19/06 235/493 |
| 2002/0084261 A1 | 7/2002 | Yamazaki | |
| 2003/0178399 A1 * | 9/2003 | Horbasz | ............... B23K 1/0056 219/121.85 |
| 2004/0026383 A1 * | 2/2004 | Zakel | ................. B23K 26/1476 219/121.6 |
| 2005/0067395 A1 * | 3/2005 | Shindo | ................. B23K 1/0056 219/121.85 |
| 2006/0065642 A1 * | 3/2006 | Shindo | ................. B23K 1/0056 219/121.63 |
| 2006/0219760 A1 * | 10/2006 | Wagoh | ................. H05K 3/3478 228/248.1 |
| 2006/0237514 A1 * | 10/2006 | Wagou | ................. B23K 3/0615 228/37 |
| 2006/0255018 A1 * | 11/2006 | Ohara | ................. B23K 1/0056 219/121.63 |
| 2006/0261045 A1 | 11/2006 | Wang et al. | |
| 2007/0102485 A1 * | 5/2007 | Fukaya | ................ B23K 1/0056 228/101 |
| 2007/0228021 A1 * | 10/2007 | Wagou | ................. B23K 1/0056 219/121.63 |
| 2008/0073413 A1 * | 3/2008 | Mizuno | ................ H05K 3/3478 228/180.22 |
| 2009/0200279 A1 | 8/2009 | Li | |
| 2009/0244508 A1 * | 10/2009 | Schoeppach | ........ G03F 7/70825 355/67 |
| 2014/0271328 A1 * | 9/2014 | Burris | ..................... B33Y 10/00 419/53 |
| 2015/0129564 A1 * | 5/2015 | Kadau | ..................... B23P 6/002 219/121.66 |
| 2015/0165556 A1 * | 6/2015 | Jones | ..................... B23K 26/34 264/482 |
| 2016/0279725 A1 * | 9/2016 | Azdasht | ............... B23K 26/354 |
| 2016/0318129 A1 * | 11/2016 | Hu | ......................... B29C 64/282 |
| 2016/0354853 A1 | 12/2016 | Azdasht | |
| 2017/0056995 A1 * | 3/2017 | Collins | ................ B23K 1/0016 |
| 2017/0100794 A1 * | 4/2017 | Wu | ......................... B23K 1/19 |
| 2017/0157839 A1 * | 6/2017 | Knoll | ................. B29C 65/1635 |
| 2018/0147646 A1 * | 5/2018 | Collins | ................ B23K 1/0016 |
| 2018/0361506 A1 * | 12/2018 | Tateyama | ........... B23K 26/0608 |
| 2020/0114471 A1 * | 4/2020 | Drechsel | .............. B23K 26/082 |
| 2020/0227840 A1 * | 7/2020 | Ho | ........................... H01R 4/62 |
| 2021/0123129 A1 * | 4/2021 | Zheng | ..................... C25D 3/38 |

FOREIGN PATENT DOCUMENTS

| | | | | |
|---|---|---|---|---|
| DE | 19544929 A1 | 6/1997 | | |
| DE | 102006022578 A1 | 1/2007 | | |
| DE | 102015103127 A1 * | 9/2016 | .......... | B23K 26/342 |
| GB | 2261620 A | 5/1993 | | |
| JP | S62173074 A | 7/1987 | | |
| JP | H03124368 A | 5/1991 | | |
| JP | 2009160602 A | 7/2009 | | |
| JP | 2013021079 A | 1/2013 | | |
| WO | 9106389 A1 | 5/1991 | | |
| WO | 2009156505 A1 | 12/2009 | | |
| WO | 2011057851 A1 | 5/2011 | | |
| WO | WO-2017103174 A1 * | 6/2017 | ......... | B23K 26/0608 |

OTHER PUBLICATIONS

Japan Patent Office, Notice of Grounds of Rejection, Application No. 2018-553403, dated Nov. 12, 2019, 9 pages.

China National Intellectual Property Administration, First Office Action and Search Report, Application No. 201880001654.2, dated Oct. 29, 2020, 21 pages.

Korean Intellectual Property Office, Notice of Rejection, Application No. 10-2018-7031303, dated Jun. 24, 2020, 12 pages.

China National Intellectual Property Administration, Second Office Action, Application No. 201880001654.2, dated Jun. 16, 2021, 15 pages.

China National Intellectual Property Administration, Third Office Action and Search Report, Application No. 201880001654.2, dated Nov. 16, 2021, 22 pages.

China National Intellectual Property Administration, Notification of Grant of Patent for Invention and Search Report, Application No. 201880001654.2, dated Feb. 14, 2022, 6 pages.

Xie, Application Status and Development Trend of Technology of Laser Overlaying in Building and Repairing, Foreign Locomotive & Rolling Stock Technology, 2012, No. 4, 9 pp. [English Language Translation of Abstract Included].

* cited by examiner

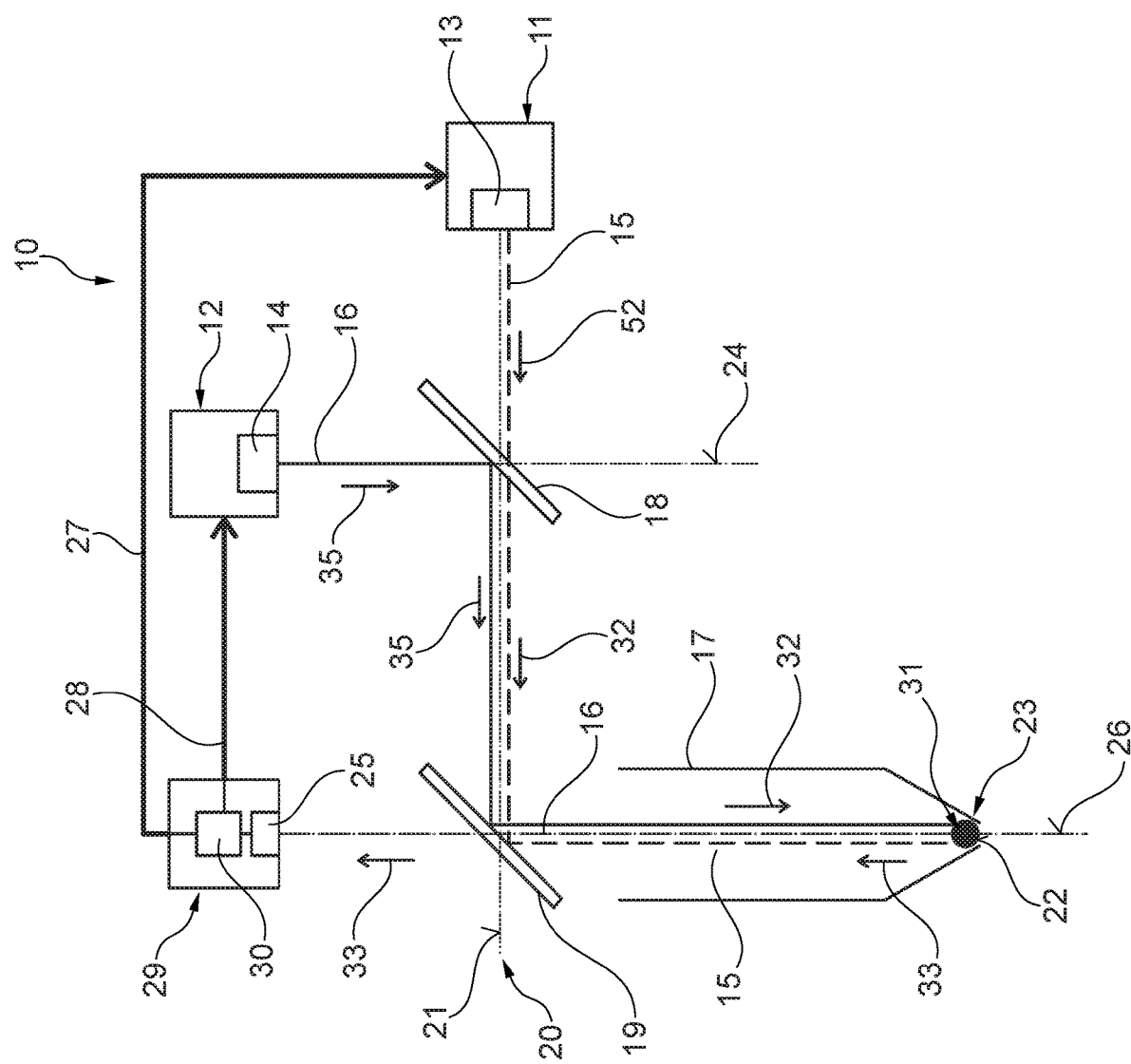

METHOD AND LASER ARRANGEMENT FOR FUSING A SOLDER MATERIAL DEPOSIT BY MEANS OF LASER ENERGY

CROSS-REFERENCE TO RELATED APPLICATIONS

This application represents the national stage entry of PCT International Application No. PCT/EP2018/053616 filed on Feb. 14, 2018, which claims the benefit of German Patent Application No. 10 2017 104 097.8 filed on Feb. 28, 2017, the entire contents of which are incorporated herein by reference for all purposes.

The invention at hand relates to a method for fusing a solder material deposit by means of laser energy, in which laser radiation emitted from a first laser source is applied to the solder material deposit in a first application phase by means of a first laser device, and laser radiation emitted from a second laser source is applied to the solder material deposit in a second application phase by means of a second laser device, said first laser source having a lower laser power than the second laser source, a switch being made from the first application phase to the second application phase by means of a switching device and said switch being triggered by a temperature sensor, by means of which the temperature of the solder material deposit is measured at least during the first application phase. Furthermore, the invention relates to a laser arrangement for carrying out the method.

Methods for fusing a solder material deposit, in which laser devices are used, are sufficiently known. For fusing solder material deposits realized in particular as solder balls, which are applied on joints between two components to be connected to each other and which are fused for producing the connection, laser energy is particularly suitable since the laser radiation comprises a high energy density and thus a punctiform application of energy to the solder material deposit suffices to fuse the solder material deposit within a very short time. The solder material is heated due to the absorption of laser energy emitted from a laser source in the form of radiation. The better the absorption capacity of the solder material deposit or rather the solder material being used as a solder material deposit, the smaller the portion of the laser radiation which is reflected from the solder material as reflection radiation without contributing to its heating. In practice, significant losses in energy caused by radiation reflection have been accepted in order to input the sufficient amount of energy, which is required for fusing, into the solder material deposit via absorption.

The object of the invention at hand is to propose a method as well as a laser arrangement such that fusing a solder material deposit requiring less laser power is enabled.

For attaining the object, the method according to the invention has the features of claim 1.

According to the invention, two laser devices are used for fusing the solder material deposit, said laser devices enabling splitting the method for fusing the solder material deposit into a first application phase and a second application phase, laser energy emitted from a first laser source being applied to said solder material deposit in the first application phase and laser energy emitted from a second laser source being applied to said solder material deposit in a second application phase. In this context, the first laser source has a lower laser power than the second laser source so that energy is input into the solder material deposit by means of the first laser source, said energy input not yet enabling fusing the solder material deposit but increasing the absorption capacity of the solder material deposit via heating the solder material deposit to a higher temperature level. By means of this, it is advantageously attained that, after switching to the second application phase by means of the second laser source, which has a larger laser power than the first laser source, only as much energy has to be additionally input into the solder material deposit as is sufficient to heat the solder material deposit to a melting temperature starting from the temperature level reached in the first application phase, whereby the reflection portion of the laser radiation is reduced owing to the increased absorption capacity of the solder material deposit after the first application phase, and consequently the radiation effectivity is increased.

A particularly positive effect, which results from splitting the method for fusing a solder material deposit into a first application phase and a second application phase according to the invention, is that the laser power of the laser device being used during the second application phase can be significantly reduced. Since the power of a laser source can generally be more precisely controlled in a lower power range than in an upper power range, a more exact control of the laser power is consequently possible on the one hand. On the other hand, thermal damage, which occurs in particular in the upper power range, can be prevented. The required laser power of the laser source of the second laser device can, in particular, be set lower from the start, which allows reducing the device costs on the one hand and also allows miniaturizing the laser arrangement used for the method on the other hand.

It is particularly advantageous if the application of laser radiation to the solder material deposit using the second laser device in the second application phase takes place in addition to the application of laser radiation using the first laser device so as to be able to operate the second laser device using even less laser power.

If the temperature sensor, which is used in the method according to the invention and which triggers the switch from the first application phase to the second application phase via the switching device, is also used for measuring the temperature of the solder material deposit during the second application phase and if the second application phase is terminated depending on the temperature of the solder material deposit, the method can be carried out using minimal technical expenditure.

Preferably, the switching temperature is chosen depending on the properties of the solder material deposit so that for determining the switching temperature the material-specific absorption capacity, which changes with the material temperature, is taken into account when defining the switching temperature in each case.

It is particularly advantageous if the first laser device is switched on in a standby mode being clocked for a defined duty cycle and is switched to an operating mode by means of the switching device depending on a current temperature of the solder material deposit measured by means of the temperature sensor. Hence it becomes possible to use the temperature sensor not only for triggering the switch from the first application phase to the second application phase or for terminating the second application phase if required but also for detecting the solder material deposit since measuring a temperature of the solder material deposit presumes the presence of a solder material deposit. Thus, the temperature sensor enables triggering the method when a temperature of the solder material deposit can be measured by means of the temperature sensor during a duty cycle of the first laser device, which is repeated in a clocked manner and during which the first laser device is in an operating mode. A temperature of the solder material deposit can obviously only be measured if a solder material deposit is present so that a temperature value determined by means of the temperature sensor indicates the presence of a solder material deposit.

The laser arrangement according to the invention has the features of claim 6.

According to the invention, the laser arrangement comprises a first laser device having a first laser source and a second laser device having a second laser source, said first laser source emitting a lower laser power than said second laser source. Furthermore, the laser arrangement according to the invention comprises a switching device for activating the second laser source, said switching device being connected to a temperature sensor for triggering the switching device.

Preferably, the first laser device comprises a diode laser as a laser source and the second laser device comprises a pulse laser as a laser source so that the special advantage resulting from carrying out the method according to the invention when choosing the laser devices can already be taken into account, i.e. the fact that a laser source having a relatively low power is used for the first laser device, said laser source having to suffice only for bringing the solder material deposit to a temperature level enabling an increased absorption capacity and that in comparison to the first laser device the second laser device is realized as a "power laser".

If the temperature sensor is realized as an infrared sensor arranged in a beam path of a reflection beam of the solder material deposit, the temperature of the solder material deposit can be measured in a contact-free manner on the one hand and the reflection beam resulting anyways from the application of laser energy can be used for measuring the temperature on the other hand.

If a beam channel, in which a laser beam path of the first laser source and a laser beam path of the second laser source extend simultaneously at least in sections, is realized for the beam path of the reflection beam, all beam paths can be shielded from the environment by realizing only one beam channel.

Preferably, the beam channel comprises a solder material deposit receptacle for receiving the solder material deposit during the first application phase and the second application phase so that the beam path serves not only for shielding the laser beam paths or the reflection beam path but also serves for a defined arrangement of the solder material deposit at a joint.

In the following, a preferred embodiment of the method according to the invention as well as a laser arrangement suitable for carrying out the method are further described by means of the drawing.

FIG. 1 illustrates a laser arrangement 10 having a first laser device 11 and a second laser device 12, said laser device 11 comprising a laser source realized as a diode laser 13 and said laser device 12 comprising a laser source realized as a pulse laser 14. In order to deflect a laser beam path 15 of the diode laser 13 as well as a laser beam path 16 of the pulse laser 14 in a beam channel realized as an application cannula 17 in the present instance, a beam deflector device 20 comprising two semi-permeable optical mirrors 18, 19 is provided, said optical mirrors 18, 19 being arranged in a row on an optical axis 21 of the diode laser 13 in such a manner that the laser beam path 15 of the diode laser 13 permeates the first mirror 18 on the optical axis 21 and the second mirror 19 deflects the laser beam path 15 of the diode laser 13 into the application cannula 17 so that the laser beam path 15 along the application cannula 17 is oriented towards a solder material deposit receptacle 23 being formed on a lower end of the application cannula 17 and being provided with an application opening 22.

The laser beam path 16 of the pulse laser 14 is deflected from an optical axis 24 of the pulse laser 14 in the direction of the optical axis 21 of the diode laser 13 by the first mirror 18 of the beam deflector device 20 and is subsequently also directed from the second mirror 19 of the beam deflector device 20 to the solder material deposit receptacle 23 formed on the lower end of the application cannula 17.

Furthermore, the laser arrangement 10 comprises a temperature sensor 25 of a sensor device 29 realized as an infrared sensor 25 in the illustrated exemplary embodiment, said temperature sensor 25 being arranged on an optical axis 26 formed within the application cannula 17 and being connected to the laser device 11 via a first signal line 27 and being connected to the laser device 12 via a second signal line 28.

Besides the temperature sensor 25, the sensor device 29 also comprises a switching device 30 which enables separately or simultaneously activating the signal lines 27 and 28. The term "signal line" is to be understood as solely functional in this instance so that signals can also be transmitted in a contact-free manner via the signal line.

For carrying out a method for fusing a solder material deposit formed as a solder ball 31 in this instance, the laser arrangement 10 is activated starting from an arrangement of the solder material deposit in the solder material deposit receptacle 23 of the application cannula 17. Depending on the embodiment of the application method for applying the solder ball 31 to a joint (not further illustrated in this instance) between two components to be connected to each other, the application opening 22 can be measured to be larger or smaller in diameter than the solder ball 31. Should a solder ball 31 be applied before the solder ball 31 is fused, the application opening of the solder ball receptacle 23 is measured to be larger than the diameter of the solder ball; should the solder ball 31 be applied after the solder ball 31 has been at least partially fused, the application opening 22 is measured to be slightly smaller in diameter than the diameter of solder ball 31.

In the case of the illustrated exemplary embodiment, the first laser device 11 provided with the diode laser 13 as a laser source is operated in a standby mode being clocked in such a manner that the diode laser 13 is switched on in constant temporal intervals for a defined duty cycle and a laser beam 32 is emitted.

In the event that a solder ball 31 is in the solder material deposit receptacle 23 of the application cannula 17, the laser beam 32 is reflected with a reflection beam 33 at least partially along the beam path axis 26, the infrared portion of the reflection beam 33 being detected by means of the temperature sensor of the sensor device 29 realized as an infrared sensor 25. In this case, the laser device 11 is switched from the standby mode to the operating mode via the signal line 27 so that the laser device 11 remains in the operating mode beyond the duty cycle for long enough until a temperature of the solder ball 31 corresponding to a defined switching temperature is measured by means of the infrared sensor 25 of the sensor device 29, and until the laser device 12 is switched to the operating mode via the signal line 28 by the signal to device 30. Thus, the pulse laser 14 is activated by emitting a laser beam 32 along the beam path 16 so that, in the present case, the solder ball 31 arranged in the solder material deposit receptacle 23 is subsequently subjected to the higher laser power of the pulse laser 14 in addition to being subjected to the laser power of the diode laser 13.

If a defined melting temperature of the solder ball 31 is attained via the reflection beam 33 by means of the infrared sensor 25, the pulse laser 14 is switched off via the switching device 30. Subsequently, the solder ball 31 is removed from the solder material deposit receptacle 23, the removal being able to be carried out by ejecting the fused solder ball 31 from the application opening 22 preferably by means of air pressure or by lifting the application cannula 17 from a substrate connected to the fused solder ball 31, depending on the diameter ratio between the application opening 22 and the solder ball 31.

The invention claimed is:

1. A method for fusing a solder material deposit with laser energy, in which laser radiation emitted from a first laser source is applied to the solder material deposit in a first application phase with a first laser device and laser radiation emitted from a second laser source is applied to the solder material deposit in a second application phase with a second laser device, said first laser source having a lower laser power than the second laser source so that the energy is input into the solder material deposit by the first laser source, said energy input not yet enabling fusing the solder material deposit but increasing the absorption capacity of the solder material deposit via heating the solder material deposit to a higher temperature level, a switch being made from the first application phase to the second application phase with a switching device, and said switch being triggered by a temperature sensor measuring a defined temperature of the solder material deposit below a fusing temperature of the solder material during the first application phase, the defined temperature selected based on a material specific absorption capacity of the solder material, wherein the temperature sensor is realized as an infrared sensor arranged on an optical axis corresponding to a beam path of a reflection beam of the solder material deposit.

2. The method according to claim 1, wherein in the second application phase, the application of laser radiation to the solder material deposit takes place using the second laser device in addition to using the first laser device.

3. The method according to claim 1, wherein during the second application phase, the temperature of the solder material deposit is measured with the temperature sensor, and the second application phase is terminated depending on the temperature of the solder material deposit.

4. The method according to claim 1, wherein the first laser device is switched on in a standby mode being clocked for a defined duty cycle and is switched to an operating mode with the switching device depending on a current temperature of the solder material deposit measured with the temperature sensor.

5. A laser arrangement for applying laser energy to a solder material deposit formed as a solder ball, said laser arrangement comprising a first laser device having a first laser source and a second laser device having a second laser source, said first laser source emitting a lower laser power than the second laser source so that the energy is input into the solder material deposit by the first laser source, said energy input not yet enabling fusing the solder material deposit but increasing the absorption capacity of the solder material deposit via heating the solder material deposit to a higher temperature level, and having a switching device for activating the second laser source, said switching device being connected to a temperature sensor for triggering the switching device at a defined temperature below a fusing temperature of the solder ball, the defined temperature selected based on a material specific absorption capacity of the solder material, and wherein the temperature sensor is realized as an infrared sensor arranged on an optical axis corresponding to a beam path of a reflection beam of the solder material deposit.

6. The laser arrangement according to claim 5, wherein the first laser device comprises a diode laser and the second laser device comprises a pulse laser.

7. The laser arrangement according to claim 1, wherein a beam channel is realized for the beam path of the reflection beam, a beam path of the first laser source and a beam path of the second laser source extending simultaneously in the beam channel at least in sections.

8. The laser arrangement according to claim 7, wherein the beam channel comprises a solder material deposit receptacle for receiving the solder material deposit during the first application phase and the second application phase.

* * * * *